United States Patent [19]
Palmer et al.

[11] Patent Number: 6,019,865
[45] Date of Patent: Feb. 1, 2000

[54] METHOD OF FORMING LABELS CONTAINING TRANSPONDERS

[75] Inventors: Eric V. Palmer, Amherst; Carolyn M. Larson, E. Amherst; Thomas P. Nash, Getzville, all of N.Y.

[73] Assignee: Moore U.S.A. Inc., Grand Island, N.Y.

[21] Appl. No.: 09/010,034

[22] Filed: Jan. 21, 1998

[51] Int. Cl.[7] .......................... B32B 31/10; B32B 31/12; B32B 31/18
[52] U.S. Cl. .................... 156/265; 156/277; 156/278; 156/289; 156/301; 340/572; 283/81
[58] Field of Search .................... 156/265, 257, 156/277, 289, 299, 300, 301, 302, 278; 340/572; 283/81, 85, 94, 101; 428/40.1, 41.8, 41.9, 343, 347, 352

[56] References Cited

U.S. PATENT DOCUMENTS

| | | |
|---|---|---|
| 4,862,160 | 8/1989 | Ekchian et al. . |
| 4,900,386 | 2/1990 | Richter-Jorgensen ............... 340/572 X |
| 4,910,499 | 3/1990 | Benge et al. . |
| 4,967,185 | 10/1990 | Montean . |
| 5,428,346 | 6/1995 | Franklin . |
| 5,497,140 | 3/1996 | Tuttle . |
| 5,528,222 | 6/1996 | Moskowitz et al. . |
| 5,574,431 | 11/1996 | McKeown et al. ..................... 340/572 |
| 5,587,703 | 12/1996 | Dumont . |
| 5,635,917 | 6/1997 | Todman . |
| 5,660,663 | 8/1997 | Chamberlain et al. . |
| 5,751,256 | 5/1998 | McDonough et al. .............. 340/572 X |
| 5,754,110 | 5/1998 | Appalucci et al. ..................... 340/572 |
| 5,838,253 | 11/1998 | Wurz et al. ........................ 340/572 X |
| 5,867,102 | 2/1999 | Souder et al. ........................... 340/572 |

FOREIGN PATENT DOCUMENTS 2 310 977   9/1997   United Kingdom .

*Primary Examiner*—Curtis Mayes
*Attorney, Agent, or Firm*—Nixon & Vanderhye P. C.

[57] ABSTRACT

A radio frequency transponder is adhered to a substrate forming a label or business form. The substrate has thermally sensitive material whereby the substrate and transponder can be conveyed through a thermal printer for printing variable or non-variable information on the web. The transponder is provided in web form and separated from the web for application to the substrate. In a further embodiment, plural plies of business forms are provided and transponders separated from a web of transponders are disposed by the plies prior to separation of the plies into discrete forms, each carrying a transponder.

11 Claims, 6 Drawing Sheets

METHOD OF FORMING LABELS CONTAINING TRANSPONDERS

TECHNICAL FIELD

The present invention relates to business labels and business forms and particularly relates to labels and forms having a radio frequency transponder capable of interrogation by a reader.

BACKGROUND

Radio frequency transponders having the capability of storing information in their memories and communicating with radio frequency readers are known. These transponders typically have read/write or read-only memories and thus have the capacity to receive, store and transmit data upon command. Such transponders have, for example, been fixed to shipping tags so that containers being shipped can be tracked from their point of origin to their destination and points in-between. It will be appreciated that bar codes have frequently been used in the past for identifying documents, for example, shipping containers. Bar code identification labels, however, can become damaged and unreadable. They also require a direct line of sight with a bar code reader or scanner in order for the scanner to be effective. In contrast to bar codes, radio frequency transponders have the capability of standing up to various environments, for example, heat and handling, where twisting or bending of the substrate is common and do not require line of sight reading.

Typically, the transponders will contain an integrated circuit with a memory stage of at least one byte. The memory may be erasable or rewritable. Additionally, the transponder may comprise a chip-less type which contains a series of resonant circuits operating at different frequencies with each resonant circuit enabled or disabled corresponding to a unique binary number. The transponder may also be a passive (battery-less) type or an active type containing a battery. Transponders are also very typically of small size, e.g., can be 2×2 inches or less in planar form with a thickness of approximately ⅛-inch.

DISCLOSURE OF THE INVENTION

According to the present invention, there is provided a method of forming a business label and business form, each having a transponder integrated into the label or form. To accomplish this, the transponders may be provided in web form from a supply roll of transponders and separated, e.g., cut to form discrete transponders, or may be provided as individual pieces. As the transponders are separated from the web or provided as individual pieces, they may be applied directly to a substrate, preferably in the form of a continuous web. For example, the substrate may comprise paper having an adhesive on one side and a release coating overlying a thermally sensitive coating on its opposite side, i.e., a linerless label web for thermal printing. Upon passage of the substrate through a thermal printer, heat is applied to the thermally sensitive material and an image will be formed on the substrate. Thus, by adhering transponders separated from the web of transponders onto a web of thermally treated linerless label material at spaced locations therealong, there is formed a continuous web of linerless labels with transponders carried thereby which can be passed through a thermal printer. While the thermal printer is preferably located downstream of the application of the transponder to the substrate, the thermal printer could be located upstream of the point of application of the transponders to the web. The thermal printer may print variable or non-variable indicia onto the substrate under control of a central processing unit. The web may then be subsequently separated to form discrete labels. The resulting labels may also, of course, contain bar codes or other human-readable information as necessary or desirable. The invention is therefore useful with linerless labels wherein one side of a label has an adhesive release material, for example, silicone, overlying a thermal sensitive or receptive coating and the opposite side has a pressure-sensitive adhesive which may be repositionable, removable or permanent. Standard linerless labels, i.e., those without special treatment coatings such as thermal sensitive materials, may similarly be provided with the transponders and printed with variable or non-variable indicia on the paper substrate by standard printing techniques.

The invention is also useful in multi-ply business forms. Thus, a plurality of plies in continuous web form are supplied. One or more of the webs may contain lines of adhesive for releasably or permanently securing the plies to one another. Non-variable or variable information may be printed on one or more of the plies as desired. A transponder is adhered, preferably by adhesive, to one of the plies after being separated from a web of transponders.

Further, a data system may be used to test, verify or program the transponder. For example, a data system comprised of a computer and associated hardware and software used to process and send information to a printer can be interfaced to a reader/writer to program, test or verify the transponders on or off line during the printing and/or transponder application process.

In a preferred embodiment according to the present invention, there is provided a method of forming printed labels having transponders in each label, comprising the steps of applying an adhesive to one side of a substrate having thermally sensitive material on an opposite side thereof, adhering a transponder to one side of the substrate using the adhesive and passing the substrate, before or after adherence of the transponder to the substrate, past a thermal printer to apply indicia to the substrate, thereby forming a printed label containing a transponder.

In a further preferred embodiment according to the present invention, there is provided a method of forming printed labels having transponders in each label, comprising the steps of applying indicia to one face of a substrate, applying adhesive material to an opposite face of the substrate at a location for adhering a transponder to the substrate, adhering the transponder to the opposite side of the substrate using the adhesive material to adhere the transponder to the substrate and applying an adhesive to one side or the opposite side of the substrate.

In a still further preferred embodiment according to the present invention, there is provided a method of forming multi-ply business forms, each having a transponder, comprising the steps of supplying at least two continuous paper webs, locating a transponder between the webs and adhering the webs to one another confining the transponder between the webs.

Accordingly, it is a primary object of the present invention to provide a novel and improved method for forming labels or business forms containing radio frequency transponders.

BEST MODE FOR CARRYING OUT THE INVENTION

Figure 1:
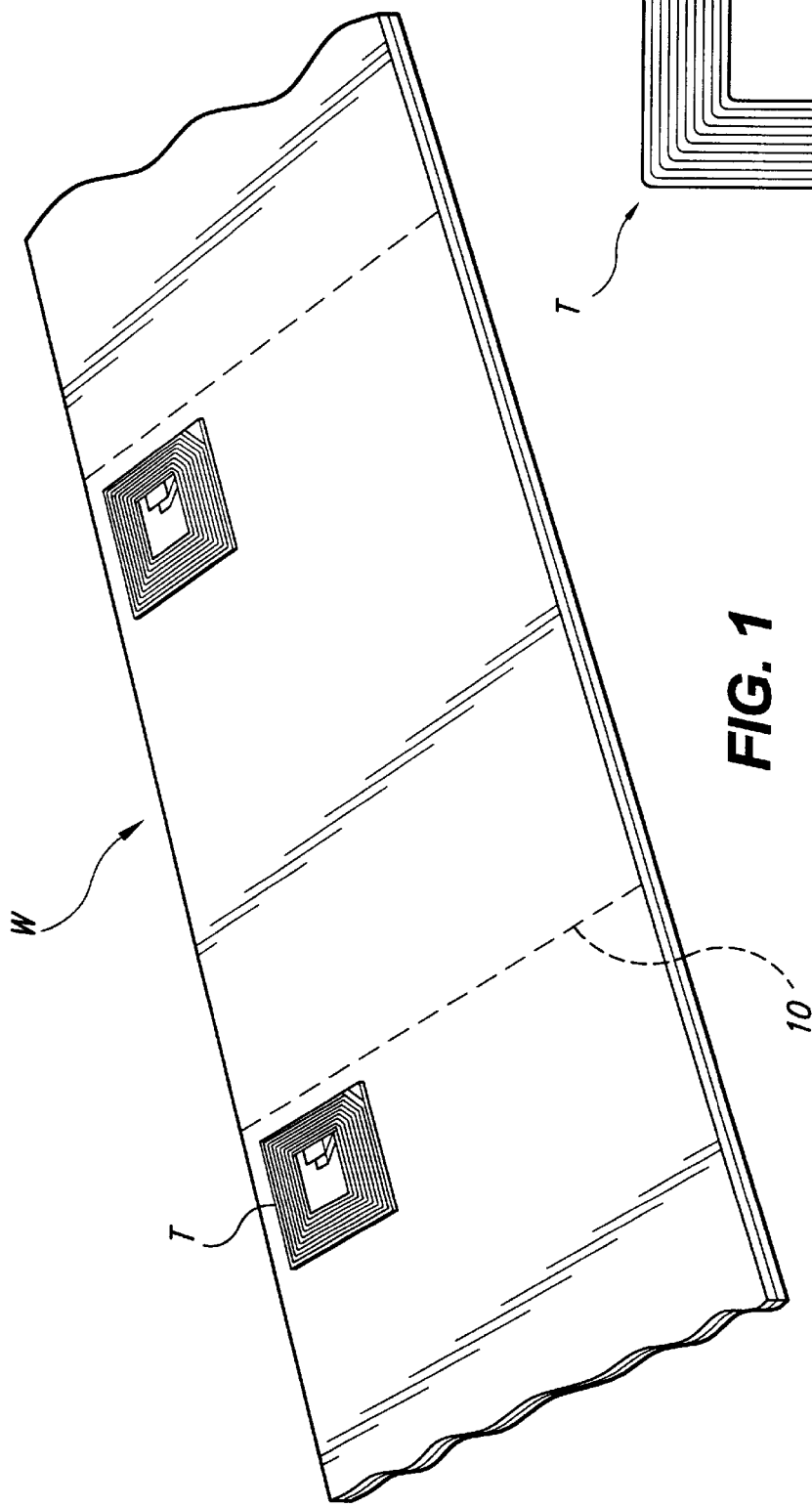
FIG. 1 is a perspective view of a web on which transponders are disposed to provide business forms or labels, each having a transponder.

Referring now to the figures and particularly to FIG. 1, there is illustrated a transponder, i.e., a radio frequency transponder, generally designated T, affixed to a series of labels or business forms illustrated in web form, generally designated W. The web W has lines of weakness 10 between the individual or discrete forms or labels whereby at the end of the fabricating process, the labels or forms can be separated from one another, for example, by cutting or bursting, to form discrete labels or forms each with a transponder T. The web W and individual labels or forms disclosed in FIG. 1 comprise the invention in its simplest form.

Figure 2:
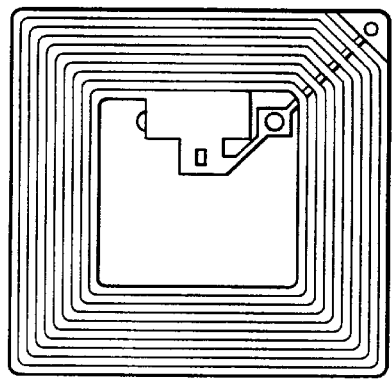
FIG. 2 is an enlarged plan view of a representative transponder.

A transponder T is illustrated in FIG. 2. As will be appreciated by those of skill in the art, the transponder may comprise an integrated circuit with a memory storage of at least one byte and has either read-only or read/write capabilities. The integrated circuit includes an RF transmitter and a receiver (in the case of read/write capabilities) and memory. With RF transponders of this type, and in the case of a read-only transponder, the data stored within the memory of the integrated circuit can be interrogated by a reader. Alternatively, the reader may provide for reading and/or storing information into a read/write transponder memory. The transponder may also be a chip-less type that contains a series of resonant circuits operating at different frequencies with each resonant circuit enabled or disabled corresponding to a unique binary number. Additionally, the transponder may be powered by a battery or may be a passive device without a battery. The transponder T illustrated in FIG. 2 may be of the type manufactured and sold by SCS Corporation, San Diego, Calif. As employed in the labels or business forms of the present invention, the transponder may range in size from 2.4"×0.4"×0.012" to approximately 2"×4.5"×0.012". A preferred thickness is about 0.012", preferably less, but the transponder may have a thickness in a range from 0.008" to 0.030".

Figure 3:
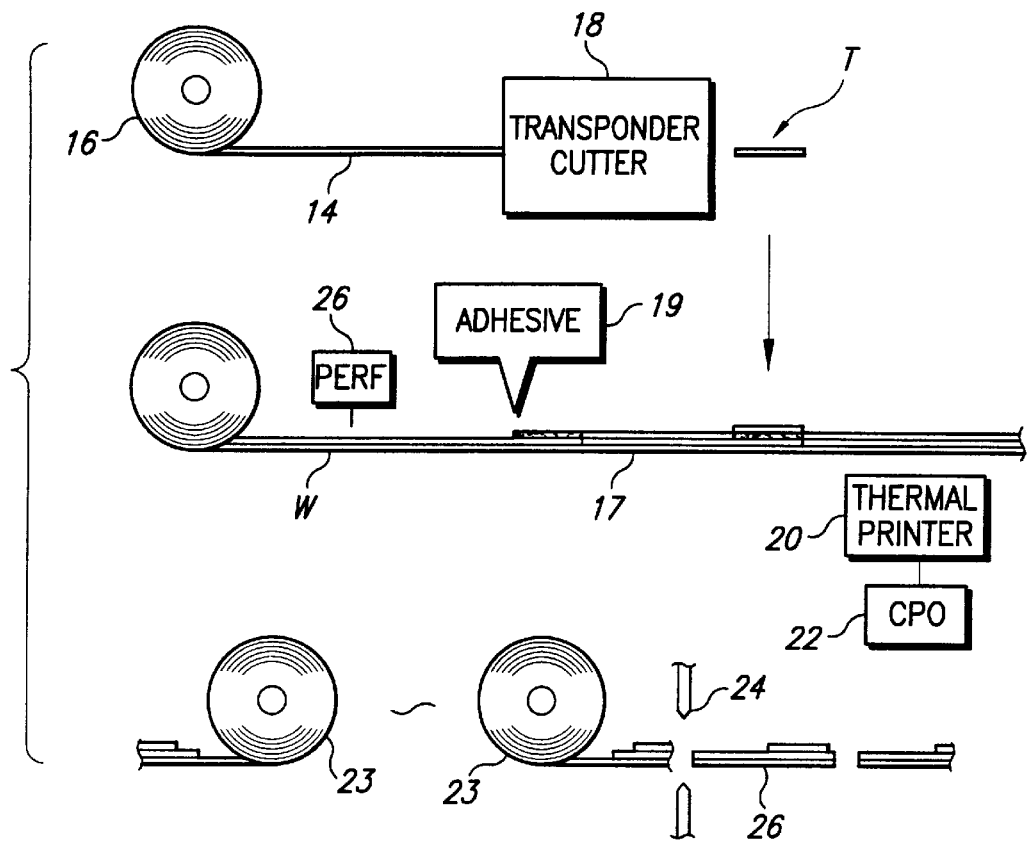
FIGS. 3, 4 and 6 are schematic illustrations of methods for applying transponders to labels or business forms.

The transponders T may be supplied in roll form. That is, the transponders themselves may be supplied in a continuous web of transponders whereby the transponders can be individually separated from the web, e.g., by cutting or bursting and applied to a business form or label. For example, referring to FIG. 3, there is illustrated a web 14 of transponders supplied in a roll 16 of transponders. A transponder separating device 18 is illustrated whereby the individual transponders in the web 14 can be separated and applied individually to a business form or label. The separating device may comprise a cutter or a burster. Alternatively, the transponders may be supplied as individual pieces. As illustrated in FIG. 3, the web W comprises a substrate, in a preferred form, comprised of paper having a thermal sensitive coating 17 on one side such that the web can be passed through a thermal printer 20 for printing indicia on the web or labels formed from the web and an adhesive coating 19 on its opposite side.

To adhere the transponder to the web W, the adhesive 19, which may comprise any one of a variety of types of repositional or permanent adhesive, is applied to the side of the web W opposite the thermal coating 17. The individual transponders T may then be applied over the adhesive as illustrated. In FIG. 3, the web with the transponders T on the web at spaced intervals is shown being passed by a thermal printer 20 under the control of a central processing unit 22 for printing indicia on the various labels comprising the web W. The indicia may be variable or non-variable indicia. The continuous web of labels may be rewound in roll form as indicated at 23 and provided to a customer. The customer may then pass the roll through a web separator 24 for separating the web into discrete linerless labels or forms, each containing a transponder. The separator 24 may comprise a cutting blade or a burster, such that the discrete labels 26 are formed. Alternatively, the web may be rewound prior to printing and supplied in roll form to the customer. The customer may then pass the web through its printer and cut or burst the web into discrete labels each containing a transponder. It will also be appreciated that the labels can be separated from the web prior to passage through the thermal printer 20. As a further alternative, the thermal printer may be upstream of the adhesive-applying station such that the discrete forms or labels as contained in the web may be supplied with the appropriate indicia. A perforator 26 is illustrated and forms the lines of weakness, for example, the perforations which facilitate the separation of the web into discrete labels and forms. Obviously, the lines of weakness can be either perforations, die-cuts with ties or even fold lines facilitating bursting operations.

Figure 4:
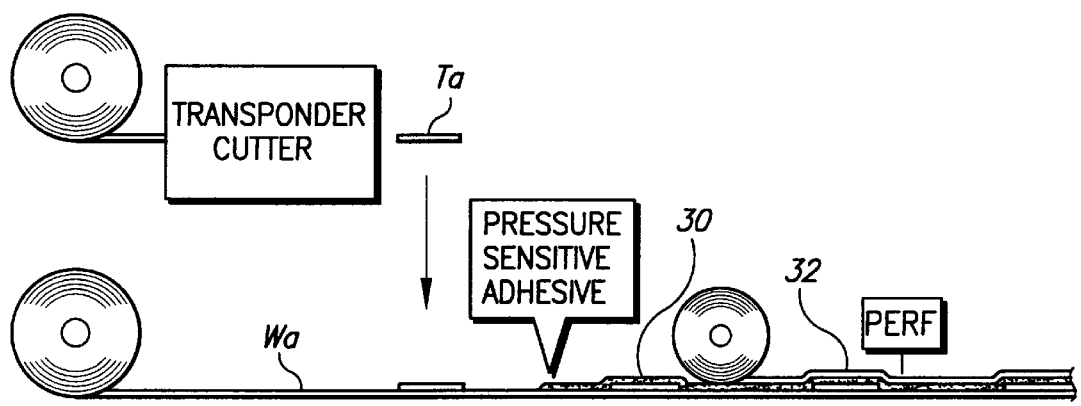

Referring now to FIG. 4, there is illustrated a further form of the present invention wherein like reference numerals are applied to like parts followed by the suffix "a." In this form, the transponder Ta is located on the web Wa, as indicated by the area, and in direct contact with the web without any intervening adhesive. As the web is advanced, a pressure-sensitive adhesive 30, either removable, repositionable or permanent, is supplied in overlying relation to the transponder Ta and to the side of the web on which the transponder is placed. The transponder is maintained on the web by the adhesive 30. A release liner 32, for example, formed of silicone, is then applied on top of the adhesive layer and the web may then be perforated or otherwise provided with lines of weakness to facilitate separation of the web into discrete labels or forms. The web may be passed through a conventional printer for printing variable or non-variable indicia and cut or burst to form discrete labels. Consequently, upon removal of the release liner 32 from each discrete label or form after separation from the web, the form or label with the transponder Ta can be applied to another surface, using the exposed pressure-sensitive adhesive to adhere the form to that surface.

Figure 5:
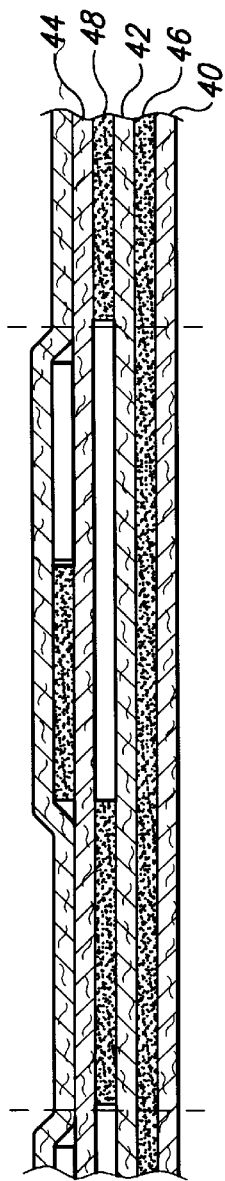
FIG. 5 is an enlarged fragmentary cross-sectional view of a form produced by the method of FIG. 6.
Figure 6:
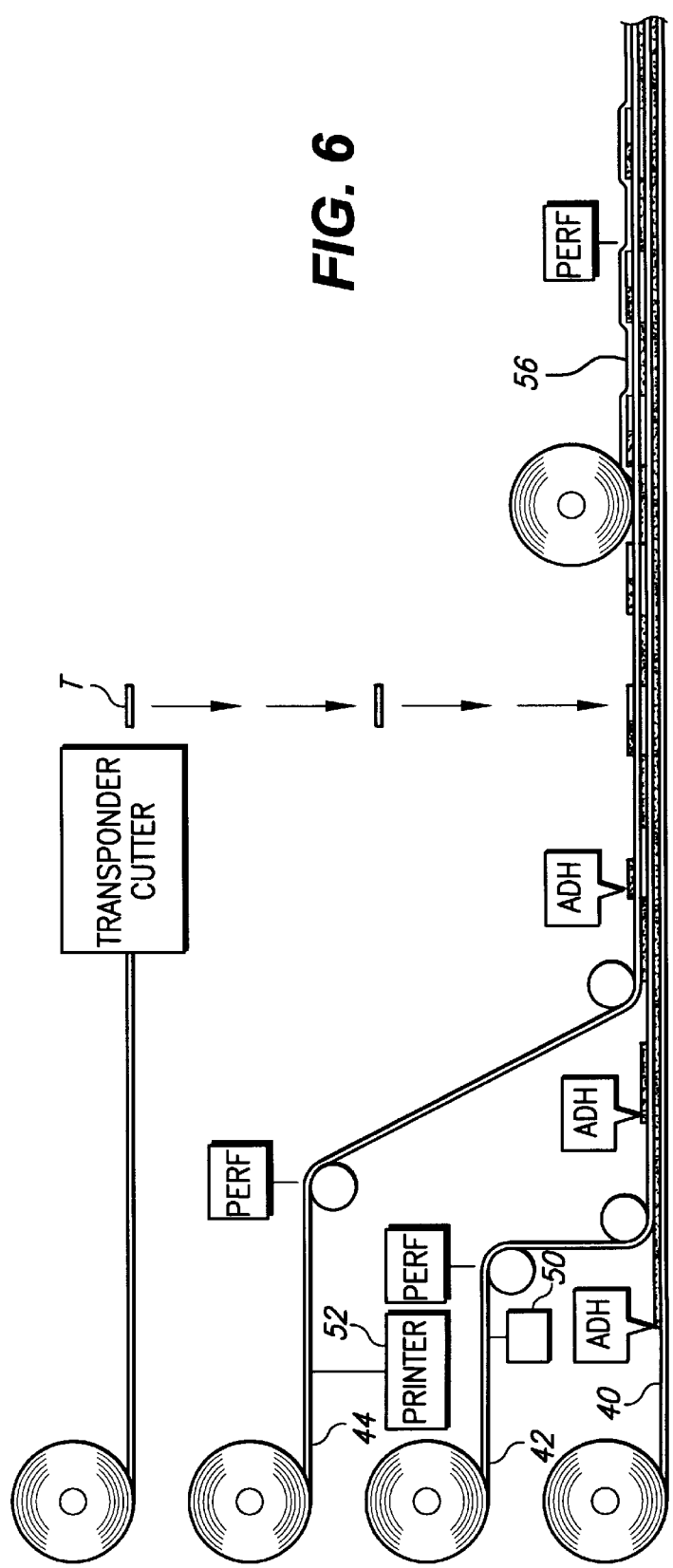

Referring now to FIGS. 5 and 6, there is illustrated a multi-ply business form and a method of fabricating the form, respectively. It will be appreciated that the form of FIG. 5 comprises as illustrated a plurality of plies, for example, paper plies 40, 42 and 44, which are adhered together by lines of adhesive 46 and 48. The lines of adhesive 46 and 48 between the plies 40, 42 and 44 are applied at discrete locations depending upon the use of the business form. Thus, there are areas between the plies on which adhesive is not applied, as illustrated in FIG. 5. Referring to FIG. 6, each of the plies 40, 42 and 44 may have printed information thereon of the variable or non-variable type or both and for that purpose, printers may be provided for each web, two printers 50, 52 being illustrated, for example, for printing on plies 42 and 44, respectively. The various forms within the plies are registered one with the other and adhered together. On ply 44, adhesive is applied at discrete locations therealong and a transponder T may be applied on top of the adhesive or directly adjacent to the adhesive in direct contact with the underlying ply. A final ply 56 is then applied over the surfaces coated with adhesive and transponder T forming the completed web. It will be appreciated that the transponder T may be either directly adhesively secured to an underlying ply or surrounded by adhesive securing portions of an overlying ply to an underlying ply, thereby confining the transponder in the business form. Lines of weakness may be provided in the individual plies at various locations depending upon the use of the form and lines of weakness may be provided after all plies are secured to one another, enabling the forms to be separated from the web, with each form or label containing a transponder.

Figure 6A:
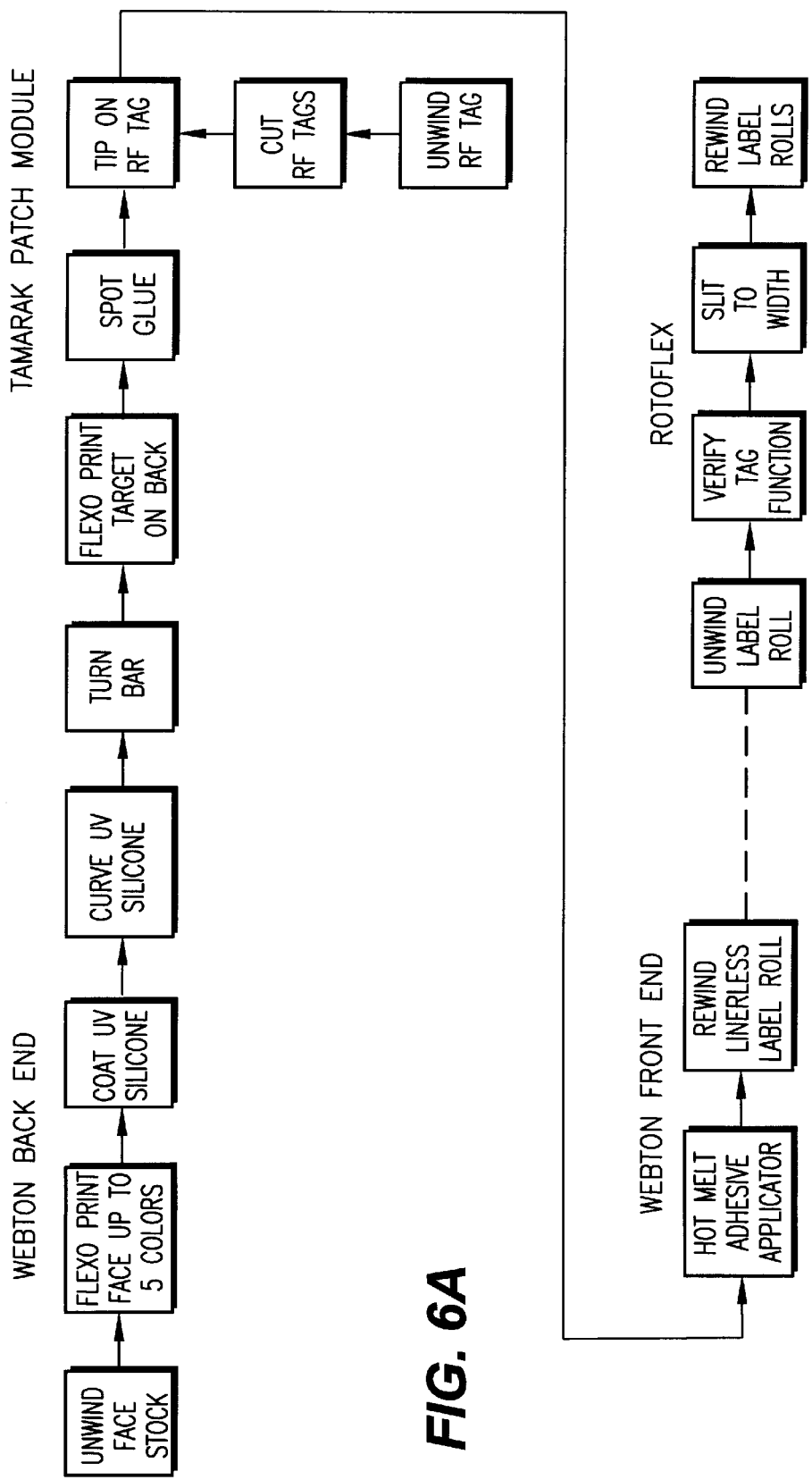
FIGS. 6A, 6B and 6C are block diagrams illustrating the present invention for forming linerless labels (FIG. 6A) or lined labels (FIGS. 6B and 6C).

In FIG. 6A, there is illustrated in block diagram form a method of forming a linerless label containing a transponder in accordance with the present invention. Particularly, face stock, for example, a paper substrate, is unwound from a roll and passed through a flexographic printer for printing on one side of the stock. The printed stock side is then coated with a UV coating, such as silicone, which is then cured. The stock is then turned over by a turn bar and a target is printed on the side of the stock opposite from the UV coating. The target indicates the location of the transponder and enables operators to check the location of the transponder once placed on the substrate. Glue is then applied to the substrate at the location of the transponder. As indicated previously, the transponder may be provided in web form or in discrete pieces. As illustrated, the web of transponders is unwound and the transponders are cut to tip onto the substrate at the location containing the glue whereby the transponder is adhered to the substrate. An applicator then applies a hot-melt adhesive in overlying relation to the transponder and the remaining margins of the substrate, the applied adhesive forming the adhesive for the linerless label. The web of completed linerless labels containing transponders may then be rewound in roll form for distribution to a customer.

Figure 6B:
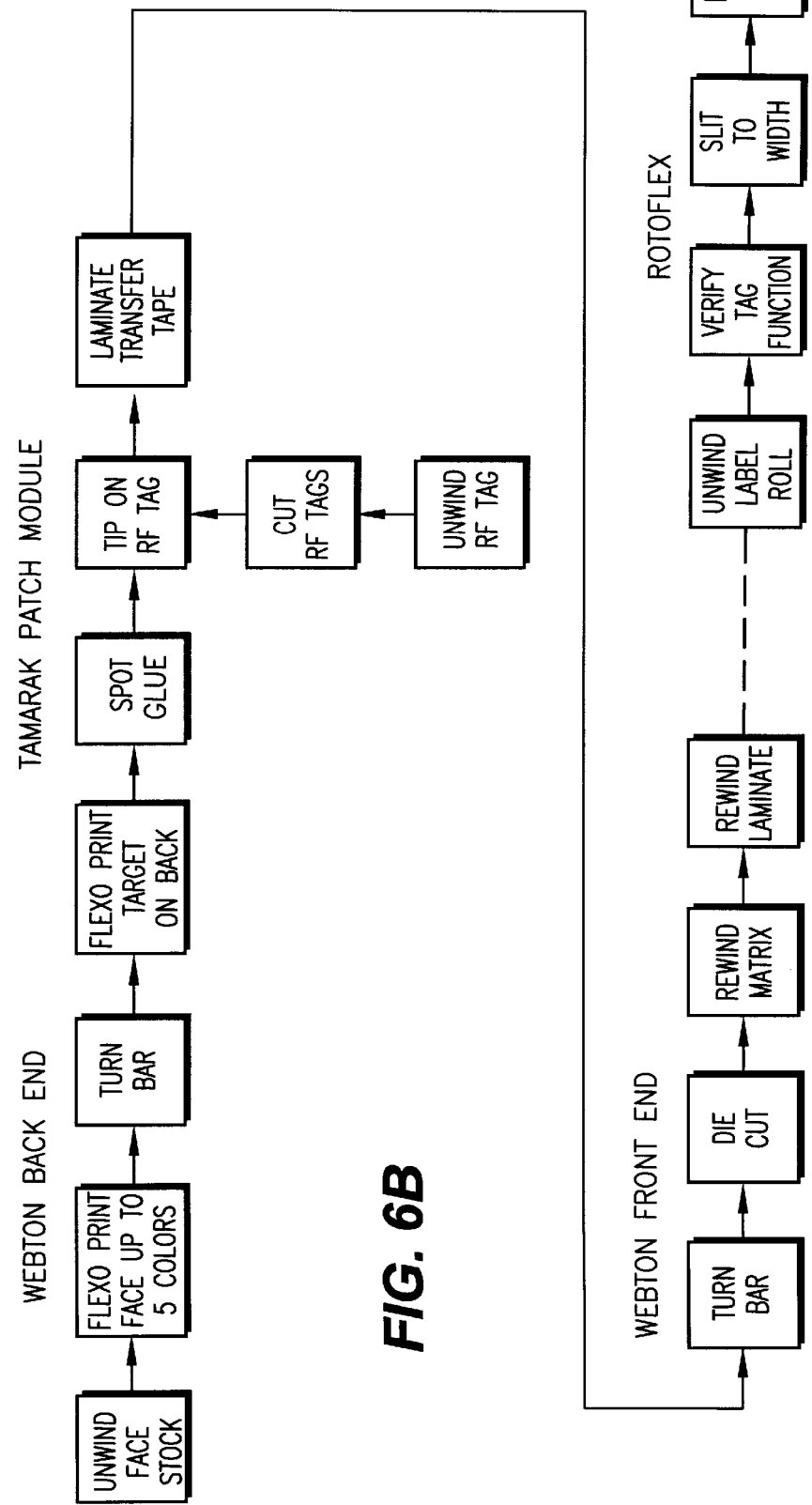

Referring to FIG. 6B, linered label containing a transponder is formed. In this illustrated process, the substrate is unwound from a roll, and printed as previously described. The web is then turned and the target is printed on the opposite side of the substrate and a glue spot is then applied. The transponders are unwound from the roll of transponders and tipped on the web at each glue spot location. A pre-manufactured transfer tape containing an adhesive is applied, adhesive face down, overlying the transponder and substrate. The transfer tape, of course, may be removed in end use, leaving the adhesive on the label whereby the label can be applied as desired. Subsequent to the application of the transfer tape, the web passes through a turn bar, is die cut and rewound for delivery to a customer.

Figure 6C:
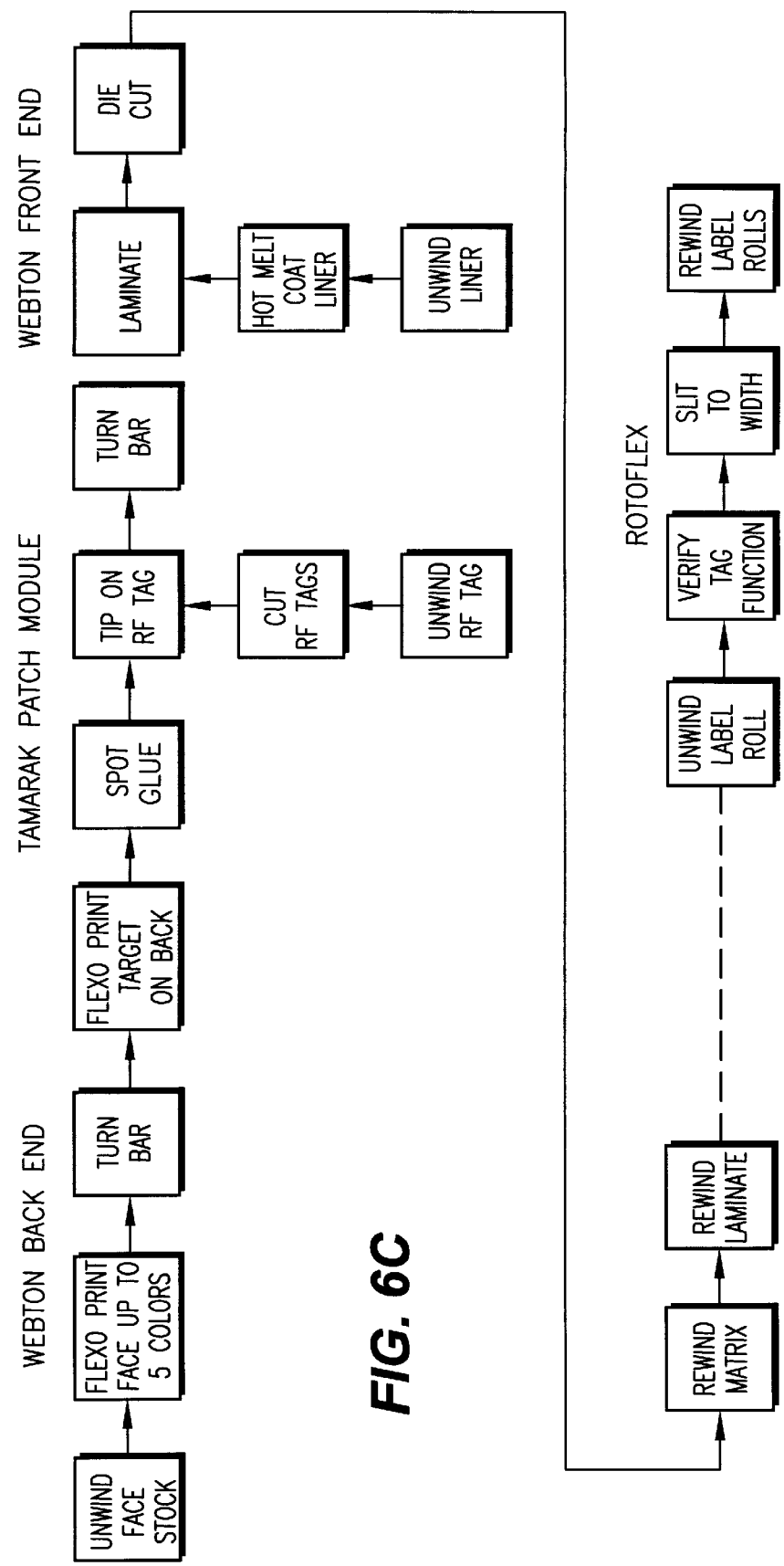

Referring to FIG. 6C, the process is the same as in FIG. 6B, except that the liner is applied in-line, rather than off-line as in FIG. 6B, and the liner is applied to the opposite side of the substrate from the transponder. Thus, in this process, the transponder is applied to the substrate similarly as in the process of FIG. 6B. Subsequent to the application of the transponder, the substrate is turned and a liner, unwound from a roll, is coated with hot-melt adhesive and laminated to the side of the substrate opposite the transponder. A liner forms a release liner in the ultimate application of the label to the end product. The substrate is then die-cut and rewound as previously described. It will be appreciated that the in-line application of the liner and hot-melt adhesive can likewise be applied to the transponder side of the substrate.

In each of the operations described in connection with FIGS. 6A–6C, the wound label containing the transponders can be unwound and the transponders interrogated to verify their information. Alternatively, the labels may be unwound and the transponders programmed by a computer and associated hardware and software. Alternatively, the transponders may be verified or programmed in-line rather than off-line as part of the processes described in FIGS. 6A–6C.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of forming printed labels having transponders in each label, comprising the steps of:

supplying a label substrate in a continuous web;

applying an adhesive to one side of the label substrate having thermally sensitive material on an opposite side thereof;

supplying transponders in a continuous web;

separating the continuous web of transponders to form individual transponders for adherence to said substrate web at spaced locations therealong;

adhering individual transponders to said one side of said substrate using said adhesive; and passing said substrate, before or after adherence of said transponders to said substrate, past a thermal printer to apply indicia to the substrate, thereby forming printed labels containing said transponders.

2. A method according to claim 1 including, after said transponders are adhered to said web, passing said substrate past the thermal printer and separating said web containing said transponders into discrete labels, each having at least one transponder.

3. A method according to claim 2 including forming lines of weakness in said web to form discrete labels.

4. A method according to claim 1 including thermally printing variable indicia on said substrate.

5. A method according to claim 1 including applying said adhesive to said substrate and overlying said transponders on said adhesive.

6. A method according to claim 1 including applying said adhesive in overlying relation to said transponder and said substrate such that said transponders contact said substrate without adhesive intervening therebetween.

7. A method according to claim 6 wherein said adhesive comprises a pressure-sensitive adhesive and including the further step of applying a release liner to said pressure-sensitive adhesive.

8. A method of forming printed labels having transponders in each label, comprising the steps of:

supplying a substrate in roll form;

applying indicia to one face of the substrate;

supplying transponders in a continuous web;

separating the continuous web of transponders to form individual transponders;

applying adhesive material to an opposite face of the substrate at locations therealong for adhering the individual transponders to the substrate;

adhering the individual transponders to said opposite face of said substrate using said adhesive material to adhere the transponders to the substrate; and applying an adhesive to said one face or said opposite face of said substrate.

9. A method according to claim 8 including applying a release coating to said one face of said substrate and applying said adhesive to said opposite face of the substrate, said transponders being applied to said opposite face of said substrate and being overlaid by said adhesive.

10. A method according to claim 8 including the step of applying a transfer tape having said adhesive on one side thereof to the opposite face of said substrate and rewinding said substrate with said applied transfer tape and transponders thereof into roll form.

11. A method according to claim 8 wherein said adhesive is applied by a step of applying a hot melt adhesive to a liner and applying the liner with hot-melt adhesive thereon to said one face or said opposite face of said substrate.

* * * * *